Dec. 13, 1955    H. D. GUMPPER ET AL    2,726,522
COUPLING DEVICE FOR MOTOR-DRIVEN COMPRESSORS
Filed Aug. 20, 1952    2 Sheets-Sheet 1

Inventor
Harold D. Gumpper
Robert C. Marsh
Barthel + Bugbee
ATTORNEYS

Dec. 13, 1955   H. D. GUMPPER ET AL   2,726,522
COUPLING DEVICE FOR MOTOR-DRIVEN COMPRESSORS
Filed Aug. 20, 1952                              2 Sheets—Sheet 2

Inventor
Harold D. Gumpper
Robert C. Marsh
Barthel & Bugbee
ATTORNEYS

2,726,522

COUPLING DEVICE FOR MOTOR-DRIVEN COMPRESSORS

Harold D. Gumpper and Robert C. Marsh, Grosse Pointe Farms, Mich., assignors to Ready-Power Company, Detroit, Mich., a corporation of Michigan Application August 20, 1952, Serial No. 305,374

5 Claims. (Cl. 64—4)

This invention relates to motor-driven pumps, compressors and the like and, in particular, to coupling devices for such equipment.

One object of this invention is to provide a coupling device for a motor-driven compressor or pump wherein the shaft seal or gasket of the compressor or pump may be removed and renewed without moving, disassembling or disconnecting the motor or compressor or pump from one another, thereby saving time and labor and consequently enabling such replacements to be made rapidly and at low cost.

Another object is to provide a coupling device of the foregoing character wherein the mechanical elements of which the coupling is composed are removable in portions, or shiftable out of the way, so that access is easily had to the seal or gasket.

Other objects and advantages of the invention will become apparent during the course of the following description of the accompanying drawings, wherein.

Hitherto, when the shaft seal or gasket of a motor or engine-driven pump or compressor failed and required renewal, it has been necessary to remove the holddown bolts either of the compressor or motor, or both, in order to slide either or both of these units axially so as to remove the gland or other gasket compressing means and gain access to the gasket or seal. These operations consume great amounts of time and labor and are consequently expensive as well as involving waste of effort.

The present invention provides a coupling device for insertion between an engine or motor and a compressor, pump or the like and has parts so arranged that certain of them may be removed and others shifted to gain access to the shaft seal or gasket without disturbing either the engine-motor or compressor-pump.

Figures 1, 3:
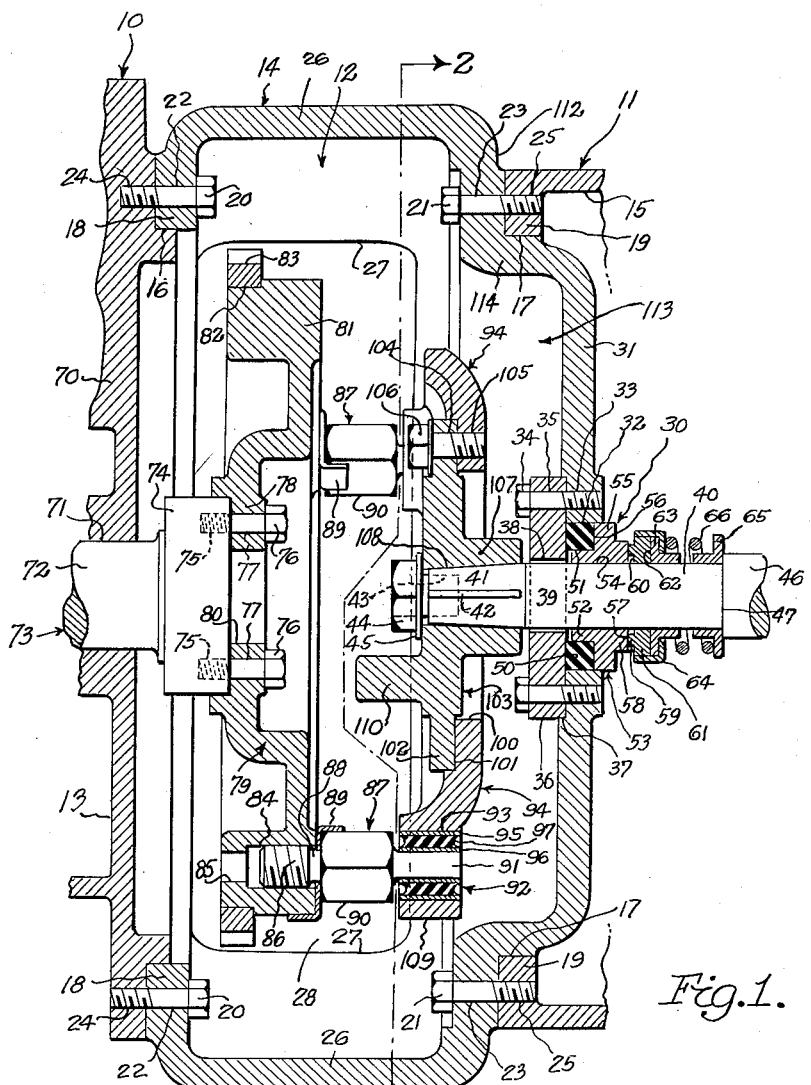
Figure 1 is a central vertical section through a coupling device for motor-driven compressors or pumps, according to one form of the invention, taken along the line 1—1 in Figure 2.
Figure 3 is a fragmentary central vertical section of a modification of the lower central portion of Figure 1.
Figure 2:
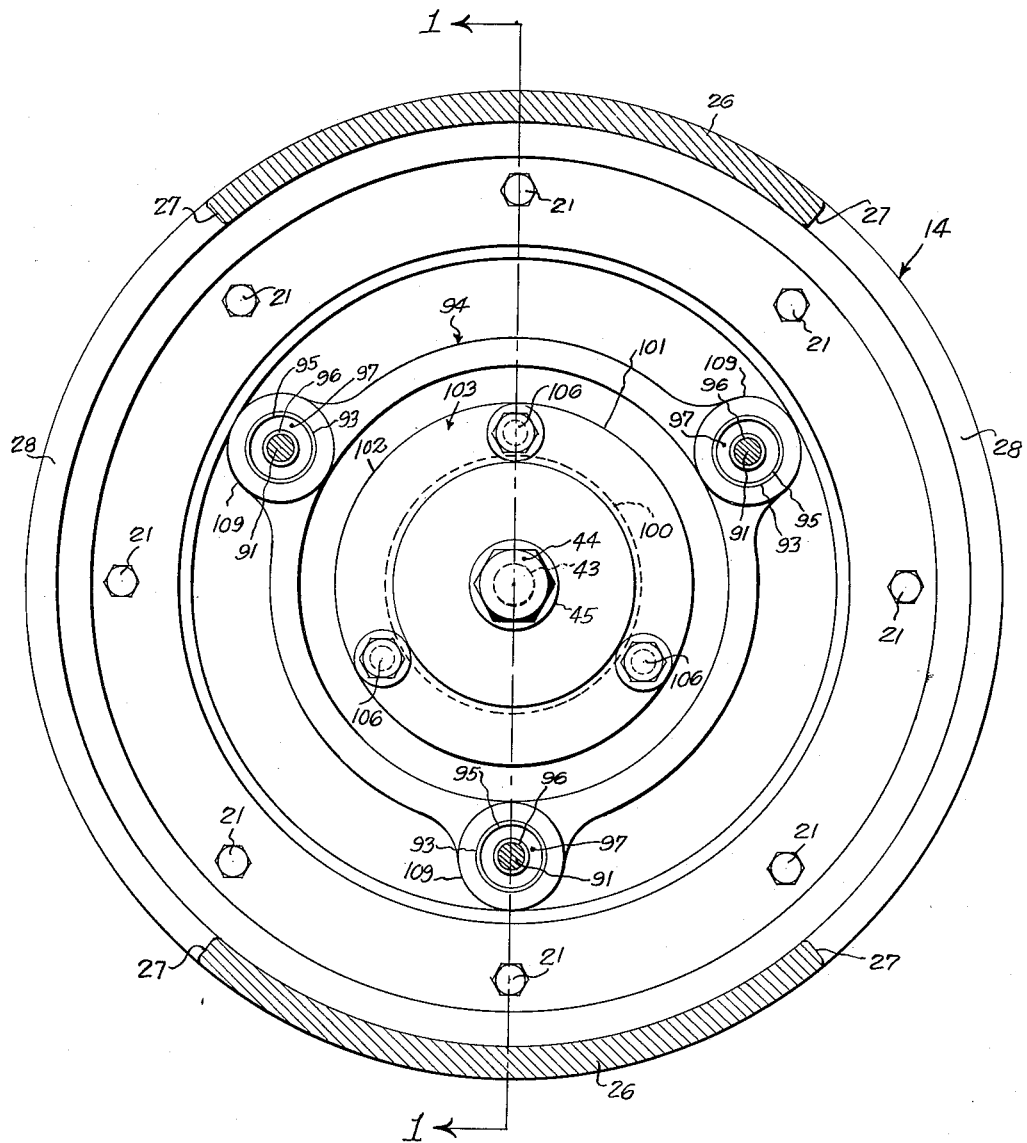
Figure 2 is a vertical cross-section taken along the line 2—2 in Figure 1.

Referring to the drawings in detail, Figures 1 and 2 show an engine, a compressor and a coupling device therefor, generally designated 10, 11 and 12 respectively, constructed according to one form of the invention, the major portions of the engine 10 and compressor 11 being conventional and therefore omitted. The engine 10 may be a prime mover of any kind such as a gasoline or diesel engine or an electric motor, and the compressor 11 may be an air compressor or a refrigerant compressor or a pump of any conventional type. The engine 10 is provided with a crankcase 13 which is connected by a coupling housing 14 to the compressor housing 15, the crankcase 13 and coupling housing 14 being provided with annular recesses 16 and 17 respectively receiving the annular rim portions 18 and 19 of the coupling housing 14 and compressor housing 15 respectively, these being secured to one another by bolts or cap screws 20 and 21 respectively passing through holes 22 and 23 into threaded bores 24 and 25.

The coupling housing 14 is provided with bridge portions 26 (Figure 2) of arcuate cross-section at top and bottom having edges 27 spaced circumferentially apart from one another approximately 100° so as to provide arcuate access openings or gaps 28 on opposite sides thereof for insertion and removal of parts of the coupling 12 and sealing device, generally designated 30 (Figure 1), the renewability of which determine the construction of the coupling 12. Inwardly of the annular recess 17, the coupling housing 14 is provided with an end wall 31 having a circular central opening or bore 32 for receiving a portion of the sealing device 30.

Disposed at intervals around the central opening 32 are threaded bores 33 for receiving the threaded portions of cap screws 34 which pass through similarly-spaced holes 35 in a circular packing retaining plate or disc 36 (Figure 1) which is received within a shallow circular recess 37 in the end wall 31 concentric with the opening 32. The disc 36 is provided with a central bore 38 with a clearance for the passage of the intermediate portion 39 of the compressor drive shaft 40, the end portion 41 of which is tapered and provided with a driving key or spline 42 as well as a threaded bore 43 into which is threaded a retaining cap screw 44 and washer 45. The compressor shaft 40 is also provided with an enlarged main shaft portion 46 providing an annular shoulder 47 between it and the intermediate shaft portion 39.

Mounted within the central bore 32 is an annular sealing gasket 50 of synthetic rubber or other suitable resilient material. The inner surface of the gasket 50 rests upon the outer surface 51 of the reduced diameter portion 52 of a collar 53, preferably of metal such as cast iron, having a central bore 54 receiving the intermediate shaft portion 39 and having an annular peripheral flange 55 projecting outwardly therefrom. The flange 55 is of circular outline fitting within the bore 32 and has a forward surface 56 which engages and compresses the gasket 50 against the disc 36 to seal the opening 32. Engaging the face 57 of the reduced diameter annular rearward portion 58 of the collar 53 is an annular ridge 59 which projects forwardly from the annular face 60 of a ring 61, preferably of carbon. Mounted upon the shaft portion 39 and engaging the rearward surface 62 of the ring 61 is a flanged collar 63, preferably of synthetic rubber or other suitable resilient material for preventing refrigerant leakage along the shaft 40 and having a flanged retaining ring 64 overhanging both the collar 63 and the ring 61. Also mounted on the intermediate shaft portion 39 is an oppositely-facing flanged collar 65 which serves as a rearward abutment for a helical compression spring 66, the forward end of which engages the flanged ring 64 and consequently urges it, the collar 63, the carbon ring 61 and the flanged collar 53 axially against the gasket or packing 50, and compressing the latter so as to seal the space between the opening 32 and the intermediate portion 39 of the compressor drive shaft 40. The assembly of the retaining plate 36, sealing gasket 50, flanged collar 53, carbon ring 61, flanged collars 63 and 65, flanged ring 64 and spring 66 comprises the sealing device 30.

The end wall 70 of the engine crankcase 13 is provided with a central bore 71 coaxial with the compressor shaft 40. For simplicity of disclosure, the crankcase 13 has been shown in the drawing as being in one piece with a plain bore 71 for the crankshaft end portion 72. As stated previously herein, this construction is conventional. In actual practice, the lower half of the crankcase 13 is made separable from the upper half thereof, and a split bearing is employed in the bore 71. This construction is well known, not only among engineers, but to the general public as well. Projecting through the bore 71 is the end portion 72 of the engine crankshaft 73, the outer end of which is provided with a cylindrical enlargement or head 74 (Figure 1). The head 74 is provided with a number of threaded bores 75 into which are threaded the ends of cap screws 76 which pass through similarly spaced bores 77 in the hub portion 78 of the engine flywheel 79, the center of which is provided with a bore or hole 80. The rim 81 of the flywheel 79 is recessed at 82 to receive the usual ring gear 83 for the starting motor pinion (not shown) and is also provided with a plurality of threaded bores 84, three being a convenient number, having their axes parallel to the axis of rotation of the shafts 73 and 40. The bores 84 are preferably spaced at equal intervals around the flywheel rim 81 and are provided with rearwardly-located holes 85 coaxial with the threaded bores 84.

Threaded into the bores 84 are the threaded inner ends 86 of coupling pins, generally designated 87, having neck portions 88 passing through lock washers 89 of Z-shaped longitudinal section. The central portion 90 of each coupling pin 87 is preferably of hexagonal or other non-circular cross-section in order to receive an ordinary wrench. The coupling pins 87 are also provided with reduced diameter portions 91 coaxial with the threaded portions 86 and projecting from the opposite side of the central portion 90. The reduced diameter portions 91 are in the form of pins projecting into resilient bushings, generally designated 92, received within circumferentially-spaced holes 93 in an annular coupling member 94. The holes 93 are coaxial with the flywheel bores 84, both sets of which bores 84 and 93 are disposed with their axes parallel to the common axis of rotation of the shafts 73 and 40. Each resilient bushing 92 consists of outer and inner coaxial sleeves 95 and 96 with an annular resilient sleeve 97 of elastic deformable material disposed therebetween. The sleeve 97 may be formed from natural or synthetic rubber or a combination of both.

The annular coupling member 94 has a central circular bore or opening 100 surrounding which is an annular recess 101, the recess 101 and bore 100 being coaxial with the axis of rotation of the shafts 40 and 73. Seated within the annular recess 101 is the peripheral flange 102 of a circular coupling disc 103, the flange 102 and the annular coupling member 94 containing circumferentially-spaced coaxially-aligned holes 104 and 105 respectively receiving cap screws 106, the inner ends of which are threaded into the bores 105, which are provided with similar threads. The central portion of the coupling disc 103 is provided with a hub 107 having a tapered bore 108 therein corresponding to and snugly receiving the tapered portion 41 of the shaft 40 and containing a keyway (not shown) receiving the key 42. The bores 93 are formed in bosses 109 (Figure 2) projecting both radially and axially from the periphery of the annular coupling member 94. Extending parallel to the axis of the shaft 40 from the inner face of the coupling disc 103 is a projection 110.

In order to provide for assembly and disassembly in the manner set forth in the statement of the operation below, the bore 100 in the annular coupling member 94 is made of a slightly larger diameter than the diameter of the retaining disc 36 so as to slide over the latter when the cap screws 106 are removed. Furthermore, in the coupling housing 14, the end wall 31 is offset axially from the annular portion 112 containing the bores 23 so as to provide a dished or cup-shaped recess 113 within the annular connecting portion 114 between the portions 112 and 31. This cup-shaped recess 113 is of sufficiently larger radius than the overall radius of the annular coupling member 94 from its center to the outer edges of the bosses 109 in order to receive the annular coupling member 94 when the latter is pushed backward over the retaining disc 36 after the cap screws 106 have been removed, as explained below.

The modification shown in Figure 3 is generally similar to the form of the invention shown in Figures 1 and 2 and similar parts are similarly designated. In Figure 3, however, the positions of the coupling pins 87 are reversed so that their threaded portions 86 are threaded into circumferentially-spaced bores 115 in the annular coupling member 94 and the coupling pin portions 91 and the resilient bushings 92 are received within circumferentially-spaced bores 116 in the flywheel rim 81. In the modification of Figure 3, therefore, the resilient connection is provided between the flywheel 79 and the coupling pins 87 whereas in Figures 1 and 2, this resilient connection is provided between the annular coupling member 94 and the coupling pins 87.

In the operation of the invention, let it be assumed that the engine or motor 10 is drivingly connected to the compressor pump 11 by means of the coupling device 12 with the parts in the positions shown in Figures 1 and 2, and that it is necessary to remove and renew one of the parts of the sealing device 30, such as the resilient gasket 50, collar 53, carbon ring 61, collars 63 and 65 or spring 66, any one of which parts may break, wear or become otherwise unsuitable for continued operation. To replace any of these parts without disconnecting the engine 10 or the compressor 11 from their respective mounting bases (not shown), the operator inserts a suitable wrench through either of the arcuate access openings 28 and removes the cap screws 106, retaining screw 44 and washer 45. He then exerts an axial pull upon the coupling disc 103 to disengage its tapered bore 108 from the tapered end 41 and key 42 of the compressor shaft 40 and removes the coupling disc 103 through either of the access openings 28. He then pushes the annular coupling member 94 rearwardly into engagement with the compressor housing end wall 31 within the cup-shaped recess 113, so that the bore 100 passes over the periphery of the retaining disc 36. When the annular coupling member 94 is pushed rearwardly toward the end wall 31, the resilient bushings 92 are stripped off of the pin portions 91 of the coupling pins 87.

With the annular coupling member 94 thus placed out of the way against the end wall 31, the operator inserts a wrench through one of the access openings 28 and removes the cap screws 34 and the retaining disc 36. This exposes the packing or gasket 50 which is pushed out of the outer end of the bore 32 by the force of the compression spring 66. A new gasket or packing ring 50 may then be inserted in place of the worn one, and the retaining disc 36 and cap screws 34 replaced in their original positions. The annular coupling member 94 may then be moved forward away from the end wall 31 after the coupling disc 103 has been reinserted through the opening 28 and its hub bore 108 re-engaged with the tapered shaft portion 47, whereupon the cap screws 106, washer 45 and screw 44 are replaced in their original positions. While this is being done, the resilient bushings 92 are aligned with the pin portions 91 so as to cause them to fit together smoothly.

What we claim is:

1. In a driving machine and driven machine having a rotary shaft spaced axially from said driving machine, a frame structure having a packing seat disposed adjacent said shaft, a shaft packing disposed in said packing seat in sealing engagement with said shaft, a packing retainer engaging and holding said packing in said seat, and a coupling device drivingly interconnecting said driving and driven machines yet enabling renewal of said shaft packing without shifting or removing said driving or driven machines or shaft, said coupling device comprising a driving member operably connected to the driving machine, a driven coupling member operably connected to the shaft of the driven machine, and coupling elements drivingly connecting said driving member to said driven coupling member, said driven coupling member including a central coupling part engageable with and disengageable from said driven shaft and a marginal coupling part separably connected to said central coupling part, said central coupling part having an axial thickness which is less than its axial separation from said driving member whereby to permit removal of said central coupling part in order to provide access to said shaft packing, said marginal coupling part having a central opening therein permitting access to said packing.

2. In a driving machine and driven machine having a rotary shaft spaced axially from said driving machine, a frame structure having a packing seat disposed adjacent said shaft, a shaft packing disposed in said packing seat in sealing engagement with said shaft, a packing retainer engaging and holding said packing in said seat, and a coupling device drivingly interconnecting said driving and driven machines yet enabling renewal of said shaft packing without shifting or removing said driving or driven machines or shaft, said coupling device comprising a driving member operably connected to the driving machine, a driven coupling member operably connected to the shaft of the driven machine, and coupling elements drivingly connecting said driving member to said driven coupling member, said driven coupling member including a central coupling part having a hub engageable with and disengageable from said driven shaft and a marginal coupling part separably connected to said central coupling part, said marginal coupling part having a central opening therein permitting access to said packing, said hub of said central coupling part having an axial thickness less than its axial separation from said driving member whereby to permit removal of said central coupling part in order to provide access to said shaft packing.

3. In a driving machine and driven machine having a rotary shaft spaced axially from said driving machine, a frame structure having a packing seat disposed adjacent said shaft, a shaft packing disposed in said packing seat in sealing engagement with said shaft, a packing retainer engaging and holding said packing in said seat, and a coupling device drivingly interconnecting said driving and driven machines yet enabling removal of said shaft packing retainer and renewal of said shaft packing without shifting or removing said driving or driven machines or shaft, said coupling device comprising a driving member operably connected to the driving machine, a driven coupling member operably connected to the shaft of the driven machine, and coupling elements drivingly connecting said driving member to said driven coupling member, said driven coupling member including a central coupling part engageable with and disengageable from said driven shaft and a marginal coupling part separably connected to said central coupling part, said central coupling part having an axial thickness which is less than its axial separation from said driving member whereby to permit removal of said central coupling part in order to provide access to said shaft packing, said marginal coupling part having a central opening therein of larger diameter than said packing retainer permitting removal therethrough of said retainer with consequent access to said packing.

4. In a driving machine and driven machine having a rotary shaft spaced axially from said driving machine, a frame structure having a packing seat disposed adjacent said shaft, a shaft packing disposed in said packing seat in sealing engagement with said shaft, a packing retainer engaging and holding said packing in said seat, and a coupling device drivingly interconnecting said driving and driven machines yet enabling renewal of said shaft packing without shifting or removing said driving or driven machines or shaft, said coupling device comprising a driving member operably connected to the driving machine, a driven coupling member operably connected to the shaft of the driven machine, and coupling elements drivingly connecting said driving member to said driven coupling member, said driven coupling member including an approximately disc-shaped central coupling part engageable with and disengageable from said driven shaft and an approximately annular marginal coupling part separably connected to said central coupling part, said central coupling part having an axial thickness which is less than its axial separation from said driving member whereby to permit removal of said central coupling part in order to provide access to said shaft packing, said marginal coupling part having a central opening therein permitting access to said packing.

5. In a driving machine and driven machine having a rotary shaft spaced axially from said driving machine, a frame structure having a packing seat disposed adjacent said shaft, a shaft packing disposed in said packing seat in sealing engagement with said shaft, a packing retainer engaging and holding said packing in said seat, and a coupling device drivingly interconnecting said driving and driven machines yet enabling renewal of said shaft packing without shifting or removing said driving or driven machines or shaft, said coupling device comprising a driving member consisting of a flywheel operably connected to the driving machine, a driven coupling member operably connected to the shaft of the driven machine, and coupling elements drivingly connecting said driving member to said driven coupling member, said driven coupling member including a central coupling part engageable with and disengageable from said driven shaft and a marginal coupling part separably connected to said central coupling part, said central coupling part having an axial thickness which is less than its axial separation from said driving member whereby to permit removal of said central coupling part in order to provide access to said shaft packing, said marginal coupling part having a central opening therein permitting access to said packing, said flywheel having circumferentially-spaced recesses therein and said coupling elements drivingly engaging said recesses.

References Cited in the file of this patent

UNITED STATES PATENTS

| | | |
|---|---|---|
| 2,460,628 | Fawick | Feb. 1, 1949 |
| 2,477,447 | Fawick | July 26, 1949 |